United States Patent Office 3,851,063
Patented Nov. 26, 1974

3,851,063
TREATMENT OF PAIN, FEVER OR
INFLAMMATION
Tsung-Ying Shen, Westfield, Howard Jones, Holmdel, and Bruce E. Witzel, Westfield, N.J., assignors to Merck & Co., Inc., Rahway, N.J.
No Drawing. Filed July 21, 1972, Ser. No. 274,038
The term of this patent subsequent to Apr. 3, 1990, has been disclaimed
Int. Cl. A61k 27/00
U.S. Cl. 424—303  3 Claims

ABSTRACT OF THE DISCLOSURE

New substituted indenyl acids and derivatives thereof which have anti-inflammatory, anti-pyretic and analgesic activity. Also included are methods of preparing said indenyl compounds, pharmaceutical compositions having said indenyl compounds as an active ingredient and methods of treating inflammation by administering these particular compositions to patients.

SUMMARY OF THE INVENTION

This invention relates to new substituted 1-benzyl (or heteroalkyl) indenyl acids, esters, amides and salts thereof and to processes for producing the same. This invention also relates to pharmaceutical compositions containing said indenyl acetic acid compounds as an active ingredient and to methods of treating pain, fever or inflammation by administering these particular compositions to patients.

DESCRIPTION AND PREFERRED EMBODIMENTS

The invention is more particularly directed to new substituted indenyl acetic acid compounds having the following general formula:

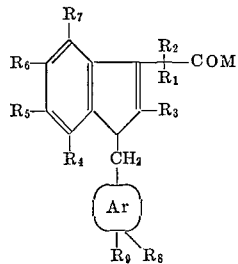

wherein:

$R_1$ and $R_2$ each may be hydrogen, halogen, alkyl, alkenyl, aryl, haloalkyl, alkylthio, arylthio, aralkylthio, amino, alkylamino, dialkylamino, acylamino, N-heterocyclic, hydroxy, alkoxy, alkenyloxy, alkynyloxy, aralkoxy, haloalkoxy, carboxy, alkoxycarbonyl or $R_1$ and $R_2$ together may be alkylene or keto;

$R_3$ may be hydrogen, alkyl, haloalkyl, alkenyl, alkynyl or trihalomethyl;

$R_4$, $R_5$, $R_6$, $R_7$, $R_8$ and $R_9$ each may be hydrogen, alkyl, acyloxy, aryloxy, alkoxy, nitro, amino, acylamino, alkylamino, dialkylamino, alkenyl, alkynyl, alkenyloxy, dialkylaminoalkyl, sulfamyl, alkylthio, alkylsulfinyl, alkylsulfonyl, hydroxy, hydroxyalkl, acyl, halo, cyano, carboxyl, carboalkoxy, carbamido, haloalkyl, cycloalkyl, trifluoromethyl or cycloalkyloxy; with the exception that when $R_8$ or $R_9$ is methylsulfinyl and the other hydrogen, $R_1$, $R_2$, $R_7$, $R_5$ and $R_4$ are each hydrogen, Ar is phenyl, $R_3$ is methyl and M is hydroxy, $R_6$ is other than fluoro;

(Ar) may be aryl heteroaryl;

M may be hydroxy, alkoxy, benzyloxy, phenoxy, benzyloxy-$C_{1-3}$ alkoxy, alkanoyloxyalkoxy of up to 6 carbon atoms, amino, alkylamino, dialkylamino, N-morpholino, hydroxyalkylamino, polyhydroxyalkylamino, aminoalkylamino, alkylaminoalkyl, dialkylaminoalkyl, OMe wherein Me is a pharmaceutically acceptable cation or Y wherein Y is:

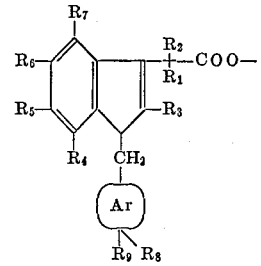

The compound which is excluded from the general formula above is disclosed in Greek Pat. No. 41,736 issued Jan. 11, 1971 corresponding U.S. Application Ser. No. 33,972 filed May 1, 1970, still pending. The compound however is disclosed as an intermediate for preparing a 1-benzylidenyl indenyl acetic acid. We have surprisingly found that this compound, along with the remaining new compounds claimed herein, have pharmaceutical properties as will be further described herein below.

The aryl or heteroaryl substituent in the 1-position of the indene nucleus may include an aryl ring system such as benzene, naphthalene or biphenyl or a heteroaryl ring system such as a pyrrole, furan, thiophene, pyridine, imidazole, pyrazine, thiazole, pyrimidine, benzothiazole, pyrazole, oxazole, pyrane, pyridazine, indole, thionaphthene, benzofuran, benzimidazole, azaindole, benzoxyrane, guinoline, isoquinoline, guinoxaline, naphthyridine, or benzoxazole and may be substituted with any of the aforementioned $R_8$ and $R_9$ substituents.

In the preferred compounds of this invention $R_1$ and $R_2$ each may be hydrogen, $C_{1-5}$ loweralkyl, $C_{2-5}$ loweralkenyl, phenyl, benzyl, hydroxy, amino, di $C_{1-5}$ loweralkylamino, $C_{1-5}$ loweralkoxy, chloro, bromo, fluoro, morpholino, $C_{1-5}$ loweralkoxy, chloro, bromo, fluoro, morpholino, $C_{1-5}$ loweralkanoylamino or $C_{1-5}$ chloro or bromo loweralkyl; $R_3$ is hydrogen, $C_{1-5}$ loweralkyl or $C_{1-5}$ chloro, bromo or fluoro loweralkyl; $R_4$, $R_5$, $R_6$ and $R_7$ may be hydrogen, halo (chloro, bromo, fluoro) $C_{1-5}$ loweralkyl, halo $C_{1-5}$ loweralkyl, $C_{1-5}$ loweralkoxy, cyano, nitro, amino, $C_{1-5}$ loweralkylamino, $C_{1-5}$ diloweralkylamino, $C_{1-5}$ loweralkoxyamino, hydroxy, $C_{1-5}$ loweralkanoyl, $C_{1-5}$ loweralkanoyl or trifluoromethyl; $R_8$ and $R_9$ are each hydrogen, chloro, bromo, fluoro, $C_{1-5}$ loweralkylthio, $C_{1-5}$ loweralkyl, trifluoromethyl, $C_{1-5}$ loweralkylsulfonyl, $C_{1-5}$ loweralkylsulfinyl, $C_{1-5}$ diloweralkylsulfamyl, nitro or $C_{1-5}$ loweralkoxy; Ar is the residue of benzene, naphthalene, pyridine, thiophene, pyrazine, pyrrole, furan, pyrimidine, benzothiazole, thiazole, pyrazole, oxazole, pyrane, pyridazine, indole, thionaphthene, benzofuran, benzimidazole, azaindole, benzoxyrane, quinoline, isoquinoline, guinoxaline, naphthyridine or benzoxazole; and M is hydroxy, $C_{1-5}$ loweralkoxy, benzyloxy, phenoxy, benzylalkoxy $C_{1-3}$ alkoxy, alkanoyloxyalkoxy of up to 6 carbon atoms, amino, $C_{1-5}$ loweralkylamino, $C_{1-5}$ diloweralkylamino, N-morpholino, hydroxy $C_{1-5}$ loweralkylamino, polyhydroxy $C_{2-5}$ loweralkylamino, and OMe wherein Me is a pharmaceutically acceptable cation.

In the most preferred aspect of this invention $R_1$ is hydrogen; $R_2$ is hydrogen, $C_{1-5}$ loweralkyl, hydroxy, amino, di $C_{1-5}$ loweralkylamino, $C_{1-5}$ loweralkoxy, chloro, bromo, fluoro, morpholino or $C_{1-5}$ loweralkanoylamino; $R_3$ hydrogen, $C_{1-5}$ loweralkyl or $C_{1-5}$ haloloweralkyl; $R_4$, $R_5$, $R_6$ and $R_7$ may each be hydrogen, chloro, bromo, fluoro, $C_{1-5}$ loweralkyl, $C_{1-5}$ loweralkoxy, nitro, amino, $C_{1-5}$ loweralkylamino, halo $C_{1-5}$ loweralkyl, $C_{1-5}$ diloweralkylamino, $C_{2-5}$ loweralkanoylamino, hydroxy or trifluoromethyl, at most only 2 of $R_4$, $R_5$, $R_6$ or $R_7$ being other than hydrogen at any one time; $R_8$ and $R_9$ are each hydrogen, $C_{1-5}$ loweralkylsulfinyl, $C_{1-5}$ loweralkylsulfonyl, chloro, bromo, fluoro, $C_{1-5}$ loweralkylthio, $C_{1-5}$ loweralkyl, trifluoromethyl, $C_{1-5}$ loweralkylsulfamyl, $C_{1-5}$ diloweralkylsulfamyl or nitro; Ar is phenyl; and M is hydroxy, $\alpha$ and $\beta$ glucoronide, $C_{1-5}$ loweralkoxy, benzyloxy, phenoxy, benzoxyloxy $C_{1-3}$ alkoxy, alkanoyloxyalkoxy of up to 6 carbon atoms, amino, $C_{1-5}$ loweralkylamino, $C_{1-5}$ diloweralkylamino or OMe wherein Me is an alkali or alkali earth metal.

Representative compounds of this invention are as follows:

5-Hydroxy-2-methyl-1-p-methylsulfinylbenzyl-3-indene acetic acid;
5-Methoxy-2-methyl-1-p-methylsulfinylbenzyl-3-indene acetic acid;
$\alpha$-(5-Fluoro-2-methyl-1-p-methylsulfinylbenzyl-3-indene) propionic acid;
5,6-Difluoro-2-methyl-1-p-methylsulfinylbenzyl-3-indene acetic acid;
5-Chloro-2-methyl-1-p-methylsulfinylbenzyl-3-indene acetic acid;
5-Trifluoromethyl-2-methyl-1-p-methylsulfinylbenzyl-3-indene acetic acid;
5-Methyl-2-methyl-1-p-methylsulfinylbenzyl-3-indene acetic acid;
5,7-Difluoro-2-methyl-1-p-methylsulfinylbenzyl-3-indene acetic acid;
$\alpha$-(5,7-Difluoro-2-methyl-1-p-methylsulfinylbenzyl-3-indene)propionic acid;
5-Dimethylamino-6-fluoro-2-methyl-1-p-methylsulfinyl-benzyl-3-indene acetic acid;
5-Methoxy-6-fluoro-2methyl-1-p-methylsulfinylbenzyl-3-indene acetic acid;
$\alpha$-(5-Methoxy-6-fluoro-2-methyl-1-p-methylsulfinylbenzyl-3-indene)propionic acid;
$\alpha$-(5,6-Difluoro-2-methyl-1-p-methylsulfinyl benzyl-3-indene)propionic acid;
5-Methoxy-2-methyl-1-p-methylsulfonylbenzyl-3-indene acetic acid;
5-Fluoro-2-methyl-1-p-methylsulfonylbenzyl-3-indene acetic acid;
5,6-Difluoro-2-methyl-1-p-methylsulfonylbenzyl-3-indene acetic acid;
5,7-Difluoro-2-methyl-1-p-methylsulfonylbenzyl-3-indene acetic acid;
5-Dimethylamino-6-fluoro-2-methyl-1-p-methylsulfonyl-benzyl-3-indene acetic acid;
5-Methoxy-6-fluoro-2-methyl-1-p-methylsulfonylbenzyl-3-indene acetic acid;
$\alpha$-(2-Methyl-5,6-difluoro-1-p-methylsulfonylbenzyl-3-indene)propionic acid;
5-Fluoro-2-methyl-1-p-methylsulfinylbenzylindenyl-3-aceto-$\beta$-D-glucopyranoisiduronic acid;
5-Fluoro-2-methyl-1-p-methylsulfonylbenzylindenyl-3-aceto-$\beta$-D-glucopyranoisiduronic acid;
5-Methoxy-2-methyl-1-p-methylsulfinylbenzylindenyl-3-aceto-$\beta$-D-glucopyranoisiduronic acid;
5-Chloro-2-methyl-1-p-methylsulfinylbenzylindenyl-3-aceto-$\beta$-D-glucopyranoisiduronic acid; and
5-Fluoro-2-methyl-1-p-methylsulfinylbenzylindenyl-3-acetic anhydride.

This invention also relates to a method of treating pain, fever or inflammation in patients using a compound of Formula I, particularly to the preferred compounds and especially to 1-(p-methylsulfinylbenzyl) - 2 - methyl-5-fluoro-3-indene acetic acid as the active constituent.

The compounds of the instant invention can be used to treat inflammation by reducing inflammation and relieving pain in such diseases as rheumatoid arthritis, osteoarthritis, gout, infectious arthritis and rheumatic fever. The compounds of Formula I can also be used as an antipyretic and would be administered and used in the same manner and in the same dosage ranges as if they were being used to treat inflammation as discussed further on.

The treatment of inflammation in accordance with the method of the present invention is accomplished by topically, orally, rectaly or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin Cab-O-Sil and acacia. Exemplary of liquid carriers are peanut oil, olive oil, seasame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable nonirritating excipient which is solid at room temperature, but liquid at the rectal temperature. Such materials are cocoa butter and polyethylene glycol. Gels and lotions for topical application may be prepared in conventional manners.

The compounds of Formula I and of the compositions of this invention are to be administered in an amount sufficient to treat inflammation, that is to reduce inflammation. Advantageously, the compositions will contain the active ingredient, namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The compounds of this invention may be prepared by a variety of procedures. In one process, as shown in Application Ser. No. 33,972 filed on May 1, 1970, a 3-indenyl acetic acid compound is oxidized to the corresponding 1-keto compound which in turn is reduced to the 1-hydroxy compound treated with a chlorinating agent to form the 1-chloro compound which is then reacted with an aldehyde to form a 1-($\alpha$-hydroxy arylalkylene or heteroaralkylene)-3-indenyl acetic acid compound. The hydroxy group of this compound is then converted to the $\alpha$-halo, via a chlorinating agent and the appropriate $\alpha$-halo compound then reduced to form the compounds of this invention. The starting indenyl acetic acid compound may be in the form of its free acid, ester or amide depending upon what compound is desired as the final product. Alternatively, the free acid of this invention may be first prepared followed by appropriate well-known reactions to form the desired esters, amides or anhydrides. The starting 3-indenyl acetic acid may be prepared by forming the β-aryl propionic acid from p-acetylaminobenzyl chloride, p-acetylaminobenzaldehyde or any other acylaminobenzylhalide or aldehyde by a malonic ester synthesis. The β-aryl propoionic acid is then ring-closed to form an indanone and the aliphatic side chain introduced by a Reformatsky or Wittig reaction to form the 3-indenyl-acetic acid. The preparation of these starting materials are further disclosed in U.S. Pat. 3,312,730.

Alternatively, the compounds of this invention may be prepared by the reduction of an appropriate 1-(aralkylene or heteroalkylene)-3-indenyl acetic acid or derivative. These compounds are well known and are described in U.S. Pat. 3,312,730.

The esters, amides, salts and anhydrides of this invention may also be prepared by well-known methods from the corresponding free acids.

In accordance with another aspect of this invention, therefore, the compounds of this invention may be prepared by reduction of the appropriate 1-(aralkene)-3-indenyl acetic acid or 1-(α-chloro-aralkylene)-3-indenyl acetic acid.

The following examples are given by way of illustration.

EXAMPLE 1

5-Fluoro-2-methylindene-3-acetic acid

A. p-Fluoro-α-methylcinnamic-acid: p-Fluorobenzaldehyde (200 g., 1.61 mole), propionic anhydride (315 g., 2.42 mole) and sodium propionate (155 g., 1.61 mole) are mixed in a 1 l. 3-necked flask which has been flushed with nitrogen. The flask is heated gradualy in an oil-bath to 140°. After 20 hr. the flask is cooled to 100° and poured into 8 l. of water. The precipitate is dissolved by adding potassium hydroxide (302 g.) in 2 l. of water. The aqueous solution is extracted with ether, and the ether extracts washed with potassium hydroxide solution. The combined aqueous layers are filtered, acidified with concentrated HCl, filtered and the precipitated solid washed with water and dried to yield solid p-fluoro α-methylcinnamic acid.

B. p-Fluoro-α-methylhydrocinnamic acid: To p-fluoro-α-methylcinnamic acid (177.9 g., 0.987 mole) in 3.61 2BA is added 11.0 g. of 5% Pd/C and the mixture reduced at room temperature under a hydrogen pressure of 40 p.s.i. The uptake is 31/32 lbs. (97% of theoretical). After filtering the catalyst, the filtrate is concentrated in vacuo to give the product, p-fluoro-α-methylhydrocinnamic acid.

C. 6-Fluoro-2-methylindanone: To 932 g. polyphosphoric acid at 70° on the steam bath is added p-fluoro-α-methylcinnamic acid (93.2 g., 0.5 mole) slowly with stirring. The temperature is gradually raised to 95° C., and the mixture kept at this temperature for 1 hr. The mixture is allowed to cool and added to 2 l. of water. The aqueous layer is extracted with ether, the ether solution washed twice with saturated sodium chloride solution, 5% $Na_2CO_3$ solution, water and then dried. The ether filtrate is concentrated with 200 g. silica gel and added to a five pound silica gel column packed with 5% ether-petroleum ether. The column is eluted with 5–10% ether-petroleum and followed by tlc to give 6-fluoro-2-methyl indanone.

D. 5-Fluoro-2-methylindene-2-acetic acid: A mixture of 6-fluoro-2-methylindanone (18.4 g., 0.112 mole), cyanacetic acid (10.5 g., 0.123 mole), acetic acid (6.6 g.), and ammonium acetate (1.7 g.) in dry toluene (15.5 ml.) is refluxed with stirring for 21 hr., as the liberated water is collected in a Dean-Stark trap. The toluene is concentrated and the residue dissolved in 60 ml. of hot alcohol, 2BA and 14 ml. of 2.2N aqueous potassium hydroxide solution. 22 g. of 85% KOH in 150 ml. of water is added and the mixture refluxed for 13 hr. under $N_2$. The ethanol is removed under vacuum, 500 ml. water added, the aqueous solution washed well with ether and then boiled with charcoal. The aqueous filtrate is acidified to pH 2 with 6N hydrochloric acid, cooled and the precipitate collected. In this way dried 5-fluoro-2-methylindene-3-acetic acid (m.p. 164–166°) is obtained.

EXAMPLE 2

D,L-5-fluoro-2-methyl-1-(p-chloro-α-hydroxybenzyl)-3-indenylacetic acid

A. 5-Fluoro-1-keto-2-methyl-3-indenylacetic acid: A solution of 5-fluoro-2-methyl-3-indenylacetic acid (206.22 g., 1.0 mole) and Triton B® (500 ml.) in pyridine (1000 ml.) is stirred vigorously while passing in a stream of air. Oxidation is completed in about 90 minutes as judged by the fact that no underpressure is created when the air is cut off and the flask closed. The mixture is acidified with acetic acid and the mixture concentrated to near dryness in vacuo. The residue is triturated with water (500 ml.), filtered and the precipitate dried. The residue is recrystallized from alcohol to yield 5-fluoro-1-keto-2-methyl-3-indenylacetic acid.

B. t-Butyl 5 - fluoro-1-keto-2-methyl-3-indenylacetate: To ether (200 ml.) is added 5-fluoro-1-keto-2-methyl-3-indenylacetic acid (110.1 g., 0.5 mole), concentrated sulfuric acid (5 ml.) and isobutylene (about 120 ml., 1.5 moles). The mixture is shaken at room temperature for 18 hours, chilled to 0° and the whole poured into a separatory funnel containing a mixture of sodium hydroxide (70 g.) in water (250 ml.) and ice (250 g.). The layers are separated, the water layer extracted with two 100 ml. portions of ether, the combined ethereal layers are extracted with saturated salt solution and dried ($K_2CO_3$). The mixture is flash-distilled and the residue distilled to yield t-butyl 5-fluoro-1-keto-2-methyl-3-indenylacetate.

C. t-Butyl D,L-5-fluoro - 1 - hydroxy-2-methyl-3-indenylacetate: To sodium borohydride (7.57 g. 0.20 mole) in isopropyl alcohol (800 ml.) at 20–25° is added with stirring a solution of t-butyl 5-fluoro-1-keto-2-methyl-3-indenylacetate (207.23 g., 0.75 mole) in isopropyl alcohol (800 ml.). The mixture is stirred at room temperature (25°) for 1 hour, poured into water, concentrated to near dryness in vacuo. The residue is extracted with ether and water, the ethereal layer washed with water and saturated salt solution, dried ($MgSO_4$), and concentrated to dryness in vacuo. The residue is crystallized from ethyl acetate-n-hexane to yield t-butyl D,L-5-fluoro-1-hydroxy-2-methyl-3-indenyl-acetate.

D. t-Butyl D,L-1-chloro - 5 - fluoro-2-methyl-3-indenylacetate: A mixture of t-butyl D,L-5-fluoro-1-hydroxy-2-methyl-3-indenylacetate (139.17 g., 0.5 mole) and freshly distilled phosphorous oxychloride (55.1 ml., 92.0 g., 0.6 mole) is heated slowly to 80°, maintained at 80–85° for 15 minutes and then warmed gently until solution is complete. The hot mixture is poured into a mixture of water (750 ml.) and ice (750 g.). The mixture is extracted with ether, the ethereal extract washed 3 times with water and once with saturated salt solution, dried ($MgSO_4$) and concentrated in vacuo to 300 ml. volume. To the solution is added sulfuric acid (5 ml.) and isobutylene (about 120 ml., 1.5 moles). The mixture is shaken at room temperature for 18 hours, chilled to 0° and the whole poured into a separatory funnel containing a mixture of sodium hydroxide (70 g.), water (250 ml.) and ice (250 g.). The layers are separated, the water layer extracted with two 100 ml. portions of ether, the combined ethereal layers are extracted with saturated salt solution and dried ($K_2CO_3$). The mixture is concentrated and the residue distilled under high vacuum to yield t-butyl D,L-1-chloro-5-fluoro-2-methyl-3-indenylacetate.

E. t-Butyl D,L-5-fluoro-2-methyl-1-(p-chloro-α-hydroxybenzyl)-3-indenylacetate: To the chloroester (62.55 g., 0.2 mole) from the previous step in dry ether (400 ml.) is added magnesium ribbon (4.86 g., 0.2 mole). The mixture is stirred until the magnesium dissolves and is then added dropwise with stirring to chlorobenzaldehyde (0.2 mole). The mixture is heated at reflux for 2 hours, cooled, saturated ammonium sulfate solution (20 ml.) is added gradually. Water (100 ml.) is added and the mixture filtered. The layers are separated, the aqueous extracted with two 60 ml. portions of ether. The combined ethereal extract is extracted with saturated salt solution, dried (MgSO$_4$) and concentrated to dryness in vacuo.

Similarly, when an equivalent amount of 2,4 difluorobenzaldehyde,
p-methylthiobenzaldehyde.
2-chlorobenzaldehyde,
4-bromobenzaldehyde,
2,4-dichloro or dibromobenzaldehyde,
4-methylthiobenzaldehyde,
4-methyl, ethyl, propyl, i-propyl, butyl or t-butylbenzaldehyde,
4-fluorobenzaldehyde,
4-trifluoromethylbenzaldehyde,
3-trifluoromethylbenzaldehyde,
4-dimethylsulfamylbenzaldehyde,
4-methylsulfamylbenzaldehyde,
2-nitro-4-chlorobenzaldehyde,
2-methoxy-4-dichlorobenzaldehyde,
2-nitro-4-methylbenzaldehyde,
2-nitro-4-fluorobenzaldehyde,
2-nitro-4-methoxybenzaldehyde,
p-anisaldehyde,
salicylaldehyde,
vanillin,
p-terephthalaldehydic acid amides
(e.g., the methyl, dimethyl, methylethyl and diethylamides),
pyridine 2,3 and 4-aldehydes,
thiophene 2 or 3-aldehydes,
pyrazine aldehyde,
pyrrol-2-aldehyde,
furfural,
pyrimidine-2-aldehyde,
α and β-naphthaldehyde,
benzothiazole-2-aldehyde,
3-nitrothiophene-2-aldehyde,
furyl-2-aldehyde,
1-methylpyrrol-2-aldehyde,
thiazole-2-aldehyde,
1-methylpyrazole-5-aldehyde,
oxazole-4-aldehyde,
5-styryl-6-ethoxyoxazole-2-aldehyde,
1-methylpyridine-4-aldehyde,
2-ethoxypyrane-3-aldehyde,
1-phenylpyridazine-6-aldehyde,
1-methylindole-3-aldehyde,
5-chlorobenzo-3-aldehyde,
thionaphthene-3-aldehyde,
benzofuran-5-aldehyde,
1-methylbenzimidazole-2-aldehyde,
7-aza-indole-3-aldehyde,
3-methylbenzopyrane,
quinoline and 8-aldehydes,
isoquinoline-4-aldehyde,
quinoxaline-2-aldehyde,
naphthyridine-2-aldehyde, or
benzoxazole-2-aldehyde is used in place of p-chlorobenzaldehyde in Example 2E above there is obtained the corresponding α-hydroxy 1-substiuted indenyl ester.

F. D,L-5-Fluoro-2-methyl-1-(p-chloro-α-hydroxybenzyl-3-indenylacetic acid: The ester (43.05 g., 0.1 mole) from the previous step is dissolved in acetic acid (100 ml.) and the mixture cautiously warmed to 50°. The mixture is concentrated to dryness in vacuo to yield D,L-5-fluoro-2-methyl-1-(p-chloro-α-hydroxybenzyl)-3-indenylacetic acid.

Similarly, when the α-hydroxy-1-substituted indenyl esters above are used in place of t-butyl-5-fluoro-2-methyl-1-(p-chloro-α-hydroxybenzyl)-3-indenylacetate there is obtained the corresponding free acids.

Similarly, when the 5-fluoro-2-methyl-3-indenyl acetic acid of Example 2A is replaced with an equivalent amount of ethyl-5-methoxy-2-methyl-3-indenylacetate,
ethyl-5-nitro-2-methyl-3-indenylacetate,
α-(5-methoxy-2-methyl-3-indenyl)propionic acid,
ethyl-2-methyl-5-fluoro-3-indenylacetate,
ethyl-2,6-dimethyl-3-indenyl-α-aminoacetate,
ethyl-2-methyl-5-methoxy-3-indenyl-α-dimethylaminoacetate,
methyl-5-methoxy-2-methyl-3-indenyl-α-hydroxyacetate,
methyl-5-methoxy-2-methyl-3-indenyl-α-methoxyacetate,
methyl-5-methoxy-2-methyl-3-indenyl-α-fluoroacetate,
methyl-5-methoxy-2-methyl-3-indenyl-α-morpholinoacetate,
ethyl-2-fluoromethyl-5-methoxy-3-indenylacetate or ethyl-2,6-dimethyl-3-indenyl-α-acetamidoacetate, and Examples 2A and C–E are carried out there is obtained the corresponding α-hydroxybenzyl indenyl ester.

EXAMPLE 3 t-Butyl 5-fluoro-2-methyl-1-methylene-3-indenylacetate

Methyl magnesium iodide (16.63 g., 0.1 mole) in ether ca. 2N added with stirring dropwise to t-butyl 5-fluoro-1-keto-2-methyl-3-indenyl acetate (27.63 g., 0.1 mole) in ether (100 ml.). The mixture is refluxed for 2 hours, cooled and saturated ammonium sulfate solution (10 ml.) added. Water (50 ml.) is added and the mixture filtered. The layers are separated, the aqueous extracted with two 30 ml. portions of ether and the combined ethereal extracts extracted with saturated salt solution and dried (MgSO$_4$). The mixture is concentrated to dryness in vacuo and the residue warmed in vacuo at 110° for two hours, cooled and crystallized from methylene chloride-n-hexane to yield t-butyl 5-fluoro-2-methyl-1-methylene-3-indenylacetate.

EXAMPLE 4

A. Oxiranespiro-5-fluoro-2-methyl-3-indenylacetic acid t-Butyl 5-fluoro-2-methyl-1-methylene indenylacetate from Example 3 (137.17 g., 0.5 mole) in methylene chloride (600 ml.) is cooled to 20°. A solution of peracetic acid (0.677 mole) in acetic acid is added dropwise with stirring over 15 minutes. The mixture is stirred for 18 hours during which time the temperature is not allowed to increase above 35°. The mixture is poured into water (1500 ml.) and the organic layer separated. The aqueous phase is extracted with two 300 ml. portions of methylene chloride and the combined organic phases washed with two 300 ml. portions of water and finally with 300 ml. of saturated salt solution. The organic layer is dried (MgSO$_4$), concentrated in vacuo and the residue recrystallized from ethyl acetate-n-hexane to yield oxiranespiro-5-fluoro-2-methyl-3-indenylacetic acid.

B. 1-Formyl-5-fluoro-2-methyl-3-indenylacetic acid

The epoxy acid (82.0 g., 0.35 mole) from the previous step is dissolved in benzene (500 ml.) and boron trifluoride etherate (13.2 ml., 0.1 mole) is added and the mixture swirled. After 5 minutes the mixture is extracted with two 300 ml. portions of water. The organic layer is concentrated at room temperature and then in vacuo to yield 1-formyl-5-fluoro-2-methyl-3-indenylacetic acid.

C. t-Butyl 1-formyl-5-fluoro-2-methyl-3-indenylacetate

To ether (200 ml.) is added the aldehydroacid (82.0 g., 0.35 mole) from the previous step, concentrated sulfuric acid (3.5 ml.) and isobutylene (about 80 ml., 1.0 mole). The mixture is shaken at room temperature for 18 hours, chilled to 0° and the whole poured into a separatory funnel containing a mixture of sodium hydroxide (50 g.) in water (200 ml.) and ice (200 g.). The layers are separated, the water layer extracted with two 100 ml. portions of ether, the combined ethereal layers are extracted with saturated salt solution and dried ($K_2CO_3$). The mixture is concentrated in vacuo to yield t-butyl 1-formyl-5-fluoro-2-methyl-3-indenylacetate.

D. t-Butyl D,L-5-fluoro-2-methyl-1-(p-methylthio-α-hydroxybenzyl)-3-indenylacetate To D,L-p-bromophenyl methyl sulfide (71.0 g., 0.35 mole) in ether (500 ml.) is added magnesium (8.5 g., 0.35 mole). When the magnesium has dissolved formyl ester (101.4 g., 0.35 mole) from the previous step in ether (300 ml.) is added dropwise with stirring. The mixture is refluxed for 2 hours, cooled and saturated ammonium sulfate (20 ml.) is added. The mixture is filtered through diatomaceous earth, washed with ether and the layers separated. The ethereal solution is washed with saturated sodium chloride solution, dried ($MgSO_4$) and concentrated to dryness in vacuo. The residue is crystallized from ethyl acetate-n-hexane to yield t-butyl D,L-5-fluoro-2-methyl-1-(p-methylthio-α-hydroxybenzyl)-3-indenylacetate.

E. D,L-5-Fluoro-2-methyl-1-(p-methylthio-α-hydroxybenzyl)-3-indenylacetic acid

The ester (41.45 g., 0.1 mole) from the previous step is treated with acetic acid (200 ml.) and warmed at 50° for 1 hour. The mixture is concentrated to dryness in vacuo to yield D,L - 5-fluoro-2-methyl-1-(p-methylthio-α-hydroxybenzyl)-3-indenylacetic acid.

EXAMPLE 5

A. D,L-5-Fluoro-2-methyl-1-(p-chloro-α-chlorobenzyl)-3-indenylacetic acid

A mixture of 5-fluoro-2-methyl-1-(p-chloro-α-hydroxybenzyl)-3-indenylacetic acid (0.2 mole) from Example 2 and freshly distilled phosphorous oxychloride (35.2 ml., 38.4 g., 0.24 mole), is maintained at 80–85° for 15 minutes, then warmed gently until solution is complete. The hot mixture is poured onto a mixture of water (250 ml.) and ice (250 g.). The mixture is extracted with ether, the ethereal extract washed 3 times with water and once with saturated salt solution, dried ($MgSO_4$) and concentrated to dryness in vacuo. The residue is recrystallized from ethyl acetate to yield D,L-5-fluoro-2-methyl-1-(p-chloro-α-chlorobenzyl)-3-indenylacetic acid.

Similarly, when an equivalent amount of α-hydroxybenzyl indenyl esters or α-hydroxy-1-substituted indenyl acids from Example 2 are used in place of 5-fluoro-2-methyl - 1 - (p - methylsulfinyl - α - hydroxybenzyl)-3-indenylacetic acid there is obtained the corresponding α-chloro compounds.

B. D,L-5-Fluoro-2-methyl-1-(p-chlorobenzyl)-3-indenylacetic acid

A mixture of chloroacid (0.1 mole) from the previous step, sodium acetate (8.31 g., 0.1 mole) is dissolved in acetic acid (300 ml.) at 70°. To the solution is added palladium on carbon (10%, 3 g.) and the mixture is hydrogenated at 3 atmospheres pressure and 70°. When the hydrogenation is complete the mixture is filtered through diatomaceous earth, the cake washed and the filtrate taken to dryness in vacuo. The residue is taken up in water and ether, the layers separated and the water layer washed with ether. The combined ethereal extracts are washed with water and saturated salt solution, dried ($Na_2SO_4$) and the mixture concentrated to dryness in vacuo. The residue is recrystallized from ethyl acetate to yield D,L-5-fluoro-2-methyl-1-(p-chlorobenzyl)-3-indenylacetic acid.

Similarly, when an equivalent amount of the α-chloro compounds obtained from Example 5A above are used in place of the chloroacid in Example 5B there are obtained the corresponding 1-Ar-alkyl or hetero-alkyl indenyl compounds.

EXAMPLE 6

5-Methoxy-2-methyl-1-(p-chlorobenzyl)-indenyl-3-acetic acid

5 - Methoxy - 2 - methyl-1-(p-chlorobenzylidene)-indenyl-3-acetic acid (4.0 g.) in ethanol (200 ml.) was hydrogenated with Raney Nickel catalyst (½ tsp.) over 100 minutes at room temperature and 40 p.s.i. of hydrogen. After this time, 22 lbs. of the theoretical, 24 lbs. uptake of hydrogen had occurred and the reaction was terminated.

The reaction mixture was filtered and the solvent evaporated off to give a yellow oil. By careful trituration with mixtures of ethyl acetate and petroleum ether, the oil was induced to crystallize. It was recrystallized from ethyl acetate as a white solid, m.p. 86–87.5° having an ultraviolet spectrum in alcohol λ max. 306 (ε percent 82.7) 295 (94.5) 267 (172) 222.5 (875).

Similarly, when using the following starting materials in place of the benzylidene compound above, the following products are obtained:

| Starting materials | Products |
| --- | --- |
| 5-fluoro-2-methyl-1 - (p-methylsulfinylbenzylidene)-indenyl-3-acetic acid. | 5 - fluoro - 2 - methyl - 1 - (p - methylsulfinylbenzyl) - indenyl - 3-acetic acid. |
| 5-acetyl-2-methyl-1-(p-methylsulfinylbenzylidene)-indenyl-3-acetic acid. | 5 - acetyl - 2 - methyl - 1 - (p - methylsulfinylbenzyl) - indenyl - 3-acetic acid. |
| 6-choro-2-methyl-1 - (p-methylsulfinylbenzylidene)-indenyl-3-acetic acid. | 6 - chloro - 2 - methyl - 1 - (p - methylsulfinylbenzyl) - indenyl - 3-acetic acid. |
| 5 - dimethylamino - 2 - methyl - 1 - (p - methylsulfinylbenzylidene) - indenyl-3-acetic acid. | 5 - dimethyamino - 2 - methyl - 1 - (p - methylsulfinylbenzyl) - indenyl-3-acetic acid. |
| 5,6 - difluoro - 2 - methyl - 1 - (p-methylsulfinylbenzylidene) - indenyl-3-acetic acid. | 5,6 - difluoro - 2 - methyl - 1 - (p - methylsulfinylbenzyl) - indenyl - 3-acetic acid. |

EXAMPLE 7

The following procedure is used for molecules with hydrogenation sensitive groups present.

5-Cyano-2-methyl-1-(p-methylsulfinylbenzyl)-indenyl-3-acetic acid

5 - Cyano - 2 - methyl - 1 - (p-methylsulfinylbenzylidene)-indenyl-3-acetic acid (2.0 g.) was hydrogenated with 5% Pd/C catalyst (200 ml.) at room temperature and 42 p.s.i. hydrogen pressure in absolute alcohol (100 ml.) until the theoretical 1 equivalent of hydrogen was taken up. The product was isolated as in Example 1.

Similarly, when the following starting materials are used in place of the benzylidene compound above, the following compounds are obtained:

| Starting materials | Products |
| --- | --- |
| 5 - allyloxy - 2 - methyl - 1 - (p - methylsulfinylbenzylidene) - indenyl-3-acetic acid. | 5 - allyloxy - 2 - methyl - 1 - (p - methylsulfinylbenzyl) - indenyl - 3-acetic acid. |
| 5 - propargyloxy - 2 - methyl - 1 - (p - methylsulfinylbenzylidene) - in - denyl-3-acetic acid. | 5-propargyloxy - 2 - methyl - 1 - (p-methylsulfinylbenzyl) - indenyl - 3-acetic acid. |
| 5-chloromethoxy-2-methyl - 1 - (p-methylsulfinylbenzylidene) - indenyl-3-acetic acid. | 5-chloromethoxy - 2 - methyl - 1 - (p - methylsulfinylbenzyl) - indenyl - 3 - acetic acid. |
| 5-nitro-2-methyl-1 - (p-methylsulfinylbenzyeidene) - indenyl-3-acetic acid. | 5 - nitro-2-methyl-1 - (p-methylsulfinylbenzyl) - indenyl - 3 - acetic acid. |

EXAMPLE 8

A. Sodium-5-fluoro-2-methyl-1-(p-methylsulfinyl-benzyl)-3-indenylacetate 1.78 g. of 5 - fluoro-2-methyl-1-(p-methylsulfinyl)-benzyl)-3-indenylacetic acid in 10 ml. of methanol is added to a solution of 0.27 g. of sodium methoxide in 5 ml. of methanol. The reaction mixture is then stirred for 30 minutes and evaporated to dryness to yield sodium-5-fluoro-2-methyl-1-(p-methylsulfinylbenzyl) - 3 - indenylacetate.

B. Calcium-5-fluoro-2-methyl-1-(p-methylsulfinyl-benzyl)-3-indenylacetate

Reaction A above is employed using 2 moles of 5-fluoro-2-methyl-1-(p-methylsulfinylbenzyl) - 3 - indenyl acetic acid per mole of calcium methoxide. The reaction technique is repeated to obtain calcium-5-fluoro-2-methyl-1-(p-methylsulfinylbenzyl)-3-indenylacetate.

Similarly, when any of the acids of the previous examples are employed in reaction A or B above, there is obtained the corresponding sodium or calcium salts.

EXAMPLE 9

1-p-Methylsulfinylbenzyl-2-methyl-5-fluoro-3-indenyl-acetic acid dimethylamide A mixture of 1-p-methylsulfinylbenzyl-2-methyl-5-fluoro-3-indenylacetic acid (0.1 mole) and thionyl chloride (0.3 mole) is heated under reflux until the evolution of hydrogen chloride has stopped. The excess thionyl chloride is removed in vacuo, the residue taken up in a slight excess of ether and added slowly to a vigorously stirred ice-cold solution of dimethylamine (0.4 mole) in ether (200 ml.). The mixture is stirred overnight at room temperature, filtered and the precipitate washed well with ether, the combined ether washings are washed with water (2× 100 ml.) and dried (anhydrous magnesium sulfate). Evaporation of the filtered ether solution followed by chromatography on a silica-gel (Baker 60–100 mesh) column using v./v. 50–100% ether in petroleum ether as eluant yields 1-p-methylsulfinylbenzyl-2-methyl-5-fluoro-3-indenylacetic acid dimethylamide.

Similarly, when an equivalent amount of the acids described in the previous examples are used in place of the above acid there is obtained the corresponding dimethylamides.

Similarly, when dimethylamine is replaced with an equivalent amount of the following amines, the corresponding amides are obtained:

Morpholine
Ethanolamine
Benzylamine
N,N-diethylethylenediamine
Benzylglycinate
Piperidine
Pyrrolidine
N-methylpiperazine
N-phenylpiperazine
N-hydroxyethylpiperazine
Piperazine
Diethylamine
Diethanolamine
Aniline
p-Ethoxyaniline
p-Chloroaniline
p-Fluoroaniline
p-Trifluoromethylaniline
Butylamine
Cyclohexylamine
Methylamine
D-glucosamine
Tetra-o-acetyl-d-glucosamine
D-galactosylamine
D-mannosylamine
N,N-dimethyl-glycine amide
N,N-dibutylglycine amide
N-methyl-2-aminomethylpiperidine
N-methyl-2-aminomethylpyrrolidine
β-Ethoxyethylamine
Di(β-ethoxyethyl)amine
β-Phenethylamine
α-Phenethylamine
Dibenzylamine
D-mannosamine

EXAMPLE 10

A. Benzyl-N-[5-fluoro-2-methyl-1-(p-methylsulfinyl-benzyl)-3-indenylacetyl]-glycinate When the procedure of Example 9 is followed using benzylaminoacetate in place of dimethylamine there is obtained benzyl-N-[5-fluoro-2-methyl-1-(p-methylsulfinylbenzyl)-3-indenylacetyl]-glycinate.

B. N-[5-fluoro-2-methyl-1-(p-methylsulfinylbenzyl)-3-3-indenylacetyl]-glycine 0.003 moles of the product from A above in a mixture of ethanol (25 ml.) and in sodium hydroxide (2.5 ml.) is allowed to stand at room temperature for 18 hours. The solution is diluted with water and extracted with ether. The aqueous layer is acidified with dilute hydrochloric acid and extracted with ethylacetate. The dried acetate layer is filtered and evaporated to give N-[5-fluoro-2-methyl-1-(p-methylsulfinylbenzyl) - 3 - indenylacetyl]-glycine.

EXAMPLE 11

Esters

A. Ethyl-1-p-methylsulfinylbenzyl - 2 - methyl-5-fluoro-3-indenyl acetate: A mixture of 0.1 mole of 1-p-methylsulfinylbenzyl-2-methyl-5-fluoro-3-indenyl acetic acid, 0.2 g. of p-toluene sulfonic acid, 100 ml. of absolute ethanol and 75 ml. of dry benzene is refluxed on a steam bath while slowly distilling the solvent. After 17 hours the residual solvent is removed under reduced pressure. The residue is slurried in aqueous sodium bicarbonate and then with water until neutral. The resulting ethyl ester may be recrystallized from organic solvents such as ethyl acetate, benzene and the like. When methanol, propanol, t-butanol and benzyl alcohol are used instead of the ethanol in the above procedure, there is obtained the corresponding methyl, propyl, t-butyl and benzyl esters.

B. Methoxymethyl 1-p-methylsulfinylbenzyl - 2 - methyl-5-methoxy-3-indenyl acetate: Chloromethyl methyl ether (0.005 mole) is added to a suspension of 1-p-methylsulfinylbenzyl-2-methyl - 5 - fluoro-3-indenyl acetic acid (0.05 mole) and anhydrous potassium carbonate (0.15 mole) in 250 ml. of anhydrous acetone. The mixture is allowed to stir overnight at room temperature. Diethyl ether is added (about 200 ml.) and the mixture is filtered. The filtrate is washed once with 100 ml. of saturated sodium bicarbonate solution and twice with 100 ml. of water and dried over anhydrous sodium sulfate. It is then filtered and the solvent is removed in vacuo. The residue is chromatographed on 200 g. of acid-washed alumina, using ether-petroleum ether (varying from 10 to 60% ether by volume) as the eluant, to give methoxymethyl 1-p-methylsulfinylbenzyl - 2 - methyl-5-methoxy-3-indenyl acetate.

C. β-Diethylaminoethyl 1 - p - methylsulfinylbenzyl-2-methyl-5-fluoro-3-indenyl acetate: A solution of 0.0054 mole of N,N'-dicyclohexylcarbodiimide in 6 ml. of anhydrous tetrahydrofuran is added to a solution of 1-p-methylsulfinylbenzyl - 2 - methyl-5-fluoro-3-indenyl acetic acid (0.005 mole) and 2-diethylaminoethanol (0.0054 mole) in 17 ml. of anhydrous tetrahydrofuran. The mixture is stirred at ambient temperature overnight. The dicyclohexylurea is removed by filtration and 2 ml. of glacial acetic acid is added to the filtrate. After the mixture has stood for one hour, it is filtered and 200 ml. of ether is added to the filtrate. The solution is then extracted three times with 100 ml. of 2.5N HCl and the extracts are combined, washed twice with 100 ml. of ether, ice-cooled, made slightly alkaline with concentrated NH₄OH and extracted three times with 100 ml. of ether. The ether extracts are combined, washed ten times with 100 ml. of water to remove traces of starting amine, dried over anhydrous potassium carbonate, filtered and evaporated *in vacuo*. The residue is β-diethylaminoethyl 1-p-methylsulfinylbenzyl - 2 - methyl-5-fluoro-3-indenyl acetate.

When 2-dimethylaminoethanol,
3-dimethylamino-1-propanol,
3-diethylamino-1-propanol,
N-β-hydroxyethylpiperidine,
N-β-hydroxyethylpyrrolidine,
N-hydroxymethylpyrrolidine,
N-methyl-2-hydroxymethylpyrrolidine,
N-ethyl-2-hydroxymethylpiperidine,
1-β-hydroxyethyl-4'-methyl-piperazine or N-β-hydroxyethyl morpholine is used in the above procedure in place of 2-diethylaminoethanol, the corresponding β-dimethylaminoethyl, γ-dimethylaminopropyl, γ-diethylaminopropyl, β-N-piperidinylethyl, β-N-pyrrolidinylethyl, N - pyrrolidinylmethyl, 2'-(1' - methylpyrrolidinylmethyl), 4-methyl - 1 - piperazinylethyl, N-ethyl-2-piperidinylethyl and N-morpholinylethyl esters are obtained.

D. Phenyl-1-p-methylsulfinylbenzyl - 2 - methyl-5-fluoro-3-indenyl acetate: A solution of 0.0054 mole of N,N'-dicyclohexylcarbodiimide in 6 ml. of anhydrous tetrahydrofuran is added to a solution of 1-p-methylsulfinylbenzyl-2-methyl - 5 - fluoro-3-indenyl acetic acid (0.005 mole) and phenol (0.0054 mole) in 17 ml. of anhydrous tetrahydrofuran. The mixture is shaken vigorously and allowed to sit, stoppered, at room temperature overnight.

After filtering off the N,N'-dicyclohexylurea, 2 ml. of glacial acetic acid is added to the filtrate and the mixture allowed to stand one hour. After filtering, 200 ml. ether is added to the filtrate and the ether solution washed with 2× 100 ml. saturated sodium bicarbonate solution and 3× 100 ml. water and then dried over anhydrous sodium sulfate. The mixture is filtered, concentrated *in vacuo* to 25 ml. and chromatographed on a 150 g. acid-washed alumina column using ether-petroleum ether (v./v. 10-60%) as eluant to give phenyl-1-p-methylsulfinylbenzyl-2-methy-5-fluoro-3-indenyl acetate.

Similarly, using 2-(2-methoxyethoxy)-ethanol, glycol or N-acetyl-ethanolamine in place of phenol in the above procedure gives 2-(2-methoxyethoxy)-ethyl-1-p-methylsulfinylbenzyl)-2-methyl-5-fluoro-3-indenyl acetate,
β-hydroxyethyl-1-p-methylsulfinylbenzyl-2-methyl-5-fluoro-3-indenyl acetate and
β-acetamidoethyl-1p-methylsulfinylbenzyl-2-methyl-5-fluoro-3-indenyl acetate, respectively.

A mixture of .06 mole of sodium 1-p-methylsulfinylbenzyl-2-methyl-5-fluoro-3-indenyl acetate and 0.05 mole of trityl bromide in 100 ml. anhydrous benzene is refluxed with rapid stirring under nitrogen for 5 hours. The hot reaction mixture is filtered and the filtrate is concentrated *in vacuo* to give trityl-1-p-methylsulfinylbenzyl-2-methyl-5-fluoro-3-indenyl acetate.

When any of the other 3-indenyl acids described in other examples are used in place of the above-described acid in any of the above preparations, the corresponding esters are obtained.

EXAMPLE 12

5-Fluoro-2-methyl-1-(p-methylsulfinylbenzyl)-indenyl-3-aceto-β-D-glucopyranosiduronic acid Sodium methoxide (25% solution, 30 ml.) is added to a stirred solution of 5-fluoro-2-methyl-1-(p-methylsulfinylbenzyl)-indenyl-3-acetic acid (0.13 M) in tetrahydrofuran (800 ml.). The precipitate is filtered off and dried at 60° under vacuum.

Methyl (tri-O-acetyl-α-gencopyranosylbromide)uronate is made according to a procedure described in J. Amer. Chem. Soc. 77 3310 (1955) or J. Amer. Chem. Soc. 82 2827 (1960).

The dry sodium salt (0.1 M) and the bromopyranoside (0.12 M) are heated in dry dimethyl sulfoxide with stirring at 60° for 2 hours. The product is used as is, the free acid, is a biproduct of the next reaction.

The crude product (13 gm.) in dimethoxyethane (125 ml.) and 2.5 N hydrochloric acid (62.5 ml.) is heated to 90° for 3 hours. The solution is evaporated to 70° to ½ volume and extracted with methylene chloride (2× 30 ml.). The solution is then saturated with sodium chloride and extracted with methylene chloride again (30 ml.). Then ethylacetate (2× 50 ml.) and this last extraction washed with water (20 ml.), dried (anhydrous magnesium sulfate) filtered and evaporated to dryness. In this way the β-D-glucoronide is isolated from the starting material.

Using the same reaction procedures and techniques, the following glucoronides are obtained in accordance with the procedure of Example 12.

| Starting Materials | Products |
| --- | --- |
| 5-chloro-2-methyl-1-(p-methylsulfinylbenzyl)-indenyl-3-acetic acid. | 5-chloro-2-methyl-1-(p-methylsulfinylbenzyl)-indenyl-3-aceto-β-D-gluco-pyranosiduronic acid. |
| 5-methoxy-2-methyl-1-(p-methylsulfinylbenzyl)-indenyl-3-acetic acid. | 5-methoxy-2-methyl-1-(p-methylsulfinylbenzyl)-indenyl-3-aceto-β-D-gluco-pyranosiduronic acid. |
| 5,7-difluoro-2-methyl-1-(p-methylsulfinylbenzyl)-indenyl-3-acetic acid. | 5,7-difluoro-2-methyl-1-(p-methylsulfinylbenzyl)-indenyl-3-aceto-β-D-gluco-pyranosiduronic acid. |
| 5-dimethylamino-2-methyl-1-(p-methylsulfinylbenzyl)-indenyl-3-acetic acid. | 5-dimethylamino-2-methyl-1-(p-methylsulfinylbenzyl)-indenyl-3-aceto-β-D-gluco-pyranosiduronic acid. |

EXAMPLE 13

Pivaloyloxymethyl 1-(p-methylsulfinylbenzyl)-5-fluoro-2-methyl-3-indenyl acetate To 0.05 mole of 1-(p-methylsulfinylbenzyl)-5-fluoro-2-methyl-3-indenyl acetic acid is added 0.25 mole of pyridine and 0.05 mole of bromomethylpivalate with cooling. The reaction mixture is stirred and then poured into several volumes of ice water to precipitate the mixed acylol, the pivaloyloxymethyl derivative of 1-(p-methylsulfinylbenzyl)-5-fluoro-2-methyl-3-indenyl acetic acid.

EXAMPLE 14

5-Fluoro-2-methyl-1-(p-methylsulfinylbenzyl)-indenyl-3-acetic anhydride

A solution of 0.05 m. of N,N'-dicyclohexyl carbodiimide in 60 ml. of tetrahydrofuran is added to 0.05 m. of 5-fluoro-2-methyl - 1 - (p - methylsulfinylbenzyl)-indenyl-3-acetic acid in 25 ml. of tetrahydrofuran. The reaction mixture is shaken vigorously at about 25° for 16 hours. The dicyclohexylurea is filtered off and 2 ml. of glacial acetic acid is added to the filtrate. The solution is allowed to stand for 1 hour, filtered and 200 ml. of ether added to the filtrate. The filtrate is then extracted well with water, dried and concentrated. The desired product is purified by column chromatography on silica-gel using ether-petroleum ether as an eluant.

Similarly, when any of the other 3-indenyl acetic acids described in the other examples are used in place of the above described acid in the above preparation, the corresponding anhydrides are obtained.

EXAMPLE 15

5-Fluoro-2-methyl-1-(p-methylsulfinylbenzyl)-3-indenyl acetic acid tablets

A mixture of 250 parts of 5 - fluoro - 2 - methyl-1-(p-methylsulfinylbenzyl) - 3 - indenyl acetic acid and 25 parts of lactose is granulated with suitable water. To this mixture is then added 100 parts of maize starch. The mixture is then passed through a 16 mesh screen. The granules are dried at a temperature below 60° C., passed through a 16 mesh screen and mixed with 3.8 parts of magnesium stearate. The granules are then compressed into tablets.

What is claimed is:

1. A method of treating pain, fever or inflammation which comprises administering to a host a therapeutically effective amount of a compound of the formula:

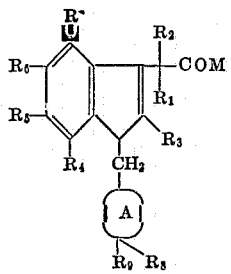

wherein:

$R_1$ is hydrogen;
$R_2$ is hydrogen or $C_{1-5}$ loweralkyl;
$R_3$ is hydrogen, $C_{1-5}$ loweralkyl or $C_{1-5}$ haloloweralkyl;
$R_4$ is hydrogen;
$R_5$ is hydrogen, $C_{1-5}$ loweralkyl or halo;
$R_6$ is hydrogen, $C_{1-5}$ loweralkoxy, halo, $C_{2-5}$ loweralkanoyl, $C_{1-5}$ diloweralkylamino, CN, allyloxy, propargyloxy, nitro or halo $C_{1-5}$ loweralkoxy;
$R_7$ is hydrogen;
$R_8$ is hydrogen or halo;
$R_9$ is hydrogen, halo, $C_{1-5}$ loweralkylsulfinyl, $C_{1-5}$ loweralkylthio, $C_{1-5}$ loweralkyl, $C_{1-5}$ diloweralkylsulfonyl, $NO_2$, $C_{1-5}$ loweralkoxy;
M is hydroxy, $C_{1-5}$ loweralkoxy, methoxymethoxy, diethylaminoethoxy, pivaloyloxymethoxy, phenoxy or alkali, or alkali earth salt; and Ar is phenyl.

2. The method of claim 1 wherein:
$R_1$ and $R_2$ are each hydrogen or loweralkyl;
$R_3$ is loweralkyl;
$R_4$–$R_7$ are each hydrogen, halo or loweralkoxy;
$R_8$ is hydrogen;
$R_9$ is loweralkylsulfinyl;
M is hydroxy; and Ar is phenyl.

3. The method of claim 1 wherein:
$R_1$, $R_2$, $R_4$, $R_5$, $R_7$ and $R_8$ are each hydrogen;
$R_3$ is methyl;
$R_6$ is fluoro;
$R_9$ is methylsulfinyl;
M is hydroxy; and Ar is phenyl.

References Cited
UNITED STATES PATENTS
3,725,548    4/1973    Shen et al.

STANLEY J. FRIEDMAN, Primary Examiner

U.S. Cl. X.R.

260—251, 256.4, 294.8, 294.9, 295, 296, 297, 302, 304, 306.8, 310, 326.3 329, 332.2, 332.3, 332.5, 347.2, 347.3, 347.4, 465, 469, 471, 473, 475, 516, 518, 519, 520, 546; 424—248, 251, 258, 263, 270, 272, 275, 285, 304, 308, 317